March 9, 1937. R. O. HELGEBY 2,073,153
SPEEDOMETER
Original Filed Dec. 23, 1932 2 Sheets-Sheet 2
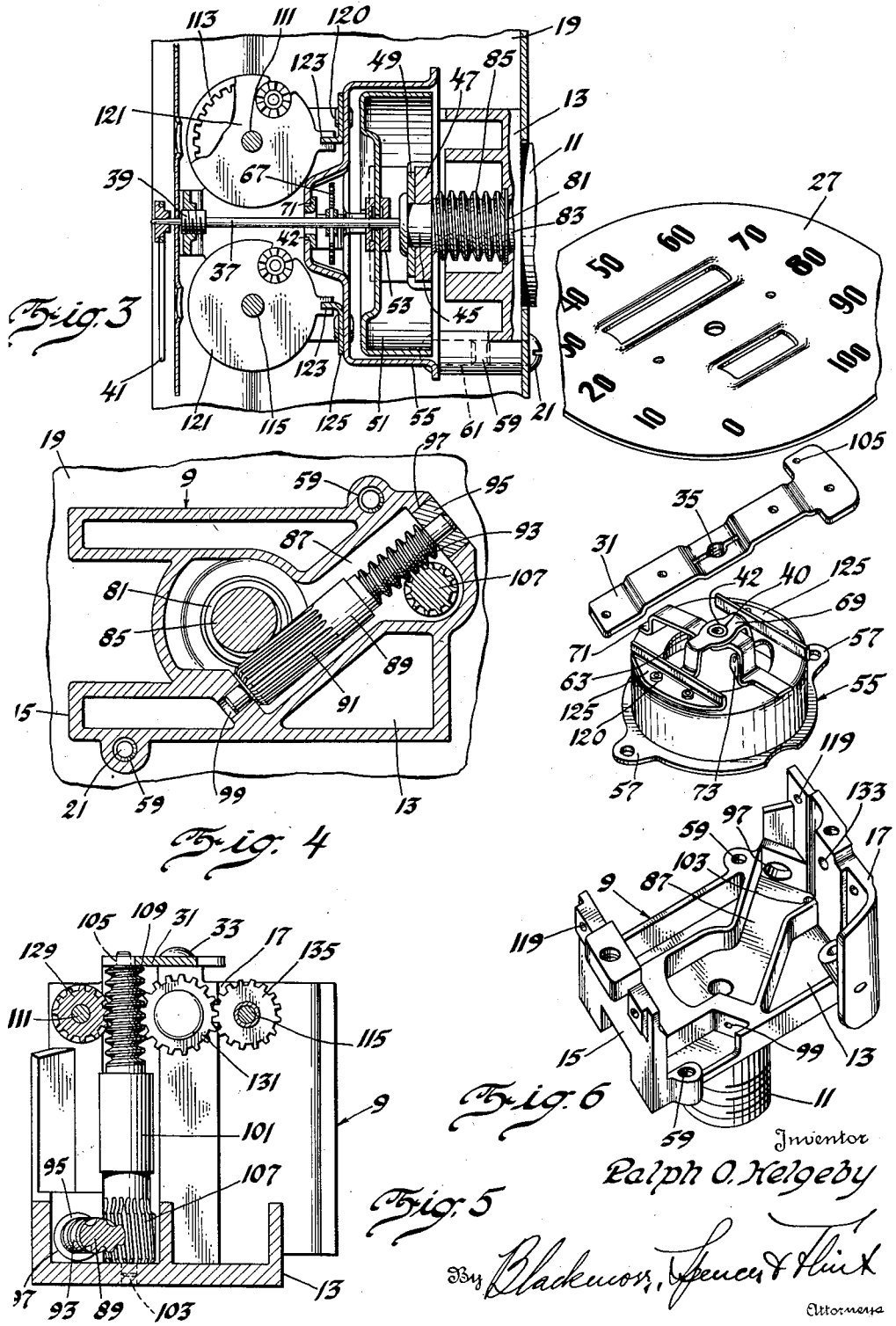
Inventor
Ralph O. Helgeby
By Blackmore, Spencer & Flint
Attorneys Patented Mar. 9, 1937

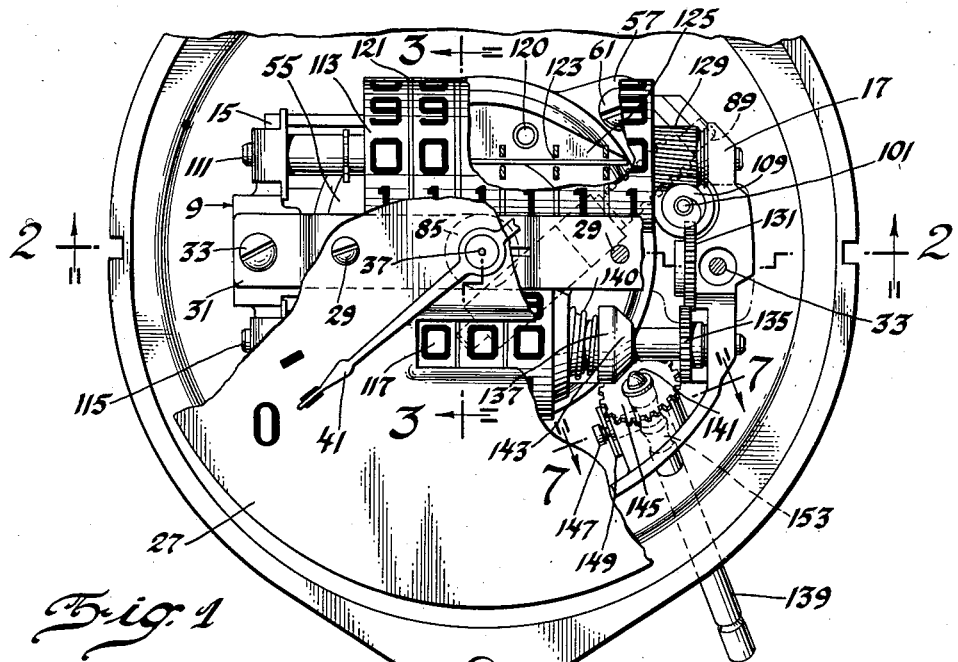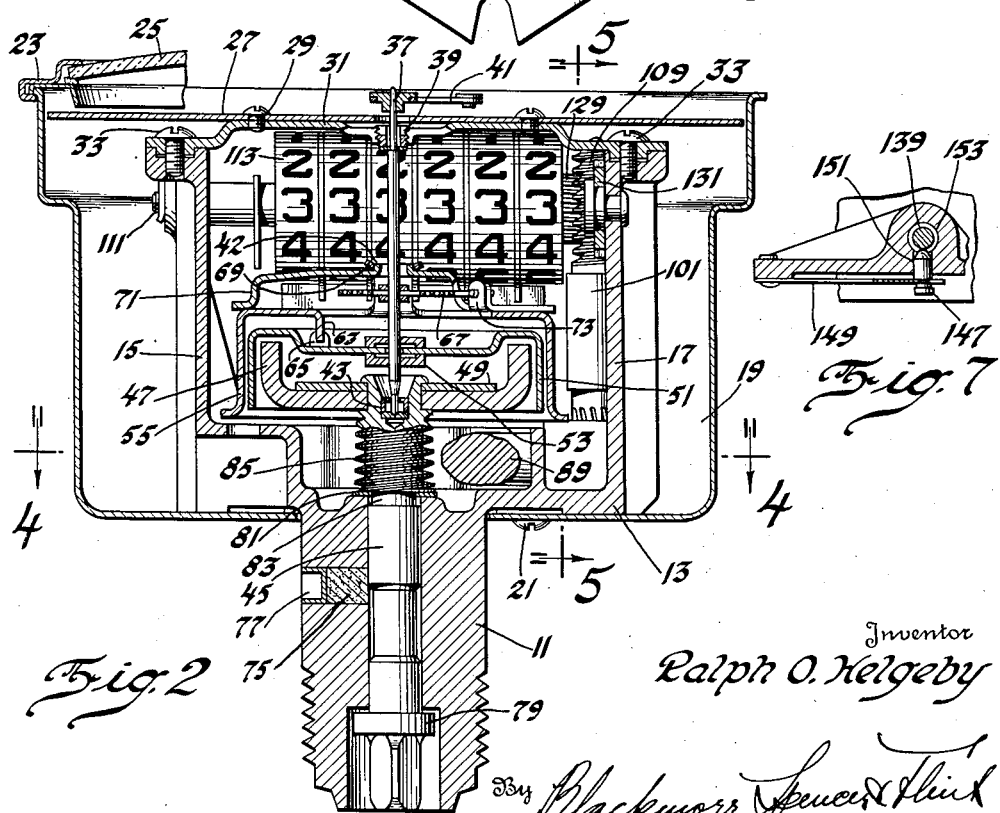

2,073,153

UNITED STATES PATENT OFFICE 2,073,153

SPEEDOMETER

Ralph O. Helgeby, Flint, Mich., assignor to General Motors Corporation, Detroit, Mich., a corporation of Delaware Original application December 23, 1932, Serial No. 648,545. Divided and this application May 22, 1935, Serial No. 22,711

2 Claims. (Cl. 264—13)

This invention relates to measuring instruments and particularly to a combined speed and distance recording instrument as used on vehicles.

A first object of the invention is to make such an instrument having the efficiency of instruments as heretofore manufactured by the use of a smaller number of parts and by the use of parts of smaller size.

Another object is to overcome manufacturing difficulties by assembling the dial plate with the instrument instead of with the casing whereby calibration for accurate readings may be made before assembly of the instrument frame within the casing.

Another object is to improve the field plate by employing a cup having an uninterrupted annular wall and with no openings to receive tongues on the transfer pinion carriers. By this means the efficiency of the field plate is considerably greater than would be the case if material were cut away from the wall to render visible characters on the underlying speed cup, or if slots be provided to locate the transfer pinion carrier.

Another object is an improvement relating to the spring regulator. By this improvement the regulator is conveniently snapped into its pivotal support whereby it has a frictional grip with the part to which it is pivoted whereby it is held in adjusted position.

Other objects and advantages will be understood from the following description.

This application is a division of my application Serial Number 648,545 filed December 23, 1932, entitled "Speedometer", now abandoned.

In the drawings, Fig. 1 is a plan view looking at the dial which is broken away to show certain operating mechanism.

Fig. 2 is a section on line 2—2 of Fig. 1.
Fig. 3 is a section on line 3—3 of Fig. 1.
Fig. 4 is a section on line 4—4 of Fig. 2.
Fig. 5 is a section on line 5—5 of Fig. 2.
Fig. 6 is a perspective showing the frame, field cup, jewel plate, and dial plate in disassembled relation.

Fig. 7 is a section corresponding to line 7—7 of Fig. 1.

Referring by reference characters to the drawings, numeral 9 represents an improved die cast frame. This frame, as a result of the novel parts associated therewith, is of smaller size than frames heretofore used. In this way economy in manufacture is effected. The frame is best illustrated in Fig. 6. It has a tubular shank 11 projecting from a base 13 and is formed with side walls 15 and 17. A casing 19 is secured to the frame by fastening means 21 as shown in Fig. 2. The casing has a bezel 23 and a glass 25.

The dial plate is shown at 27. Its mounting is unconventional in that it is secured by fastening means 29 to a jewel plate 31, the latter extending from wall 15 to wall 17 and being secured to these walls by fastening means 33.

At its mid portion the jewel plate 31 has an opening 35 to receive and hold the upper bearing 39 for the spindle 37. The spindle 37 carries a pointer 41 movable over the dial plate as usual. The lower bearings for the spindle are seen at 43 in the recess at the upper end of the rotor shaft 45. This shaft is rotatably mounted in the shank 11 as usual and is to be driven by a suitable operating cable. A U-shaped magnet 47 with a temperature compensator 49 associated therewith is secured to the upper end of the rotor shaft 45, the end of the shaft being spun over for this purpose. A speed cup 51 is clamped as at 53 to the spindle 37, its lower wall surrounding the legs of the magnet as shown. Surrounding the speed cup 51 is the field cup 55. This cup is secured by tongues 57 through which and through threaded openings 59 in the frame are passed conventional fastening means 61. The annular wall of the field cup is unbroken whereby a more efficient intensification of the magnetic flux through the speed cup is insured than in those instruments where the field cup wall is cut away to render visible speed indicating figures on the speed cup enclosed within.

A tongue 63 is bent down from the bottom of the field cup to engage an upward lug 65 on the speed cup to thereby limit the rotating movement of the latter under the influence of the spring 67. It will be understood that the parts are so assembled that when the spring 67 holds the lug and tongue in contact, the pointer registers zero.

For calibrating the spring 67 the following expedient is desired. A bridge part 69 is upwardly bent from the bottom of the field cup. Extending under the bridge and pivoted to the mid portion thereof is a lever 71. To a lug 73 on the lever 71 is secured one end of a spring 67, the other end of which is made fast to the spindle. The ends of lever 71 rest on the bottom of the field cup as shown. Rotation of the lever 71 obviously tensions the spring 67. The pivotal connection between the lever 71 and the bridge is made by providing a hole 40 in the bridge and extending therethrough an extruded lug 42 on the lever 71. The curvature of the lever 71 is greater than that of the bridge, and when the lever is positioned with its ends resting on the bottom of the field cup the extruded lug snaps readily into the hole 40 and the friction between the bridge and the lever adjacent the hole 40 and the ends of lever 71 is sufficient to hold the lever in its positions of adjustment.

The rotor shaft 45 has the additional function of driving the odometer mechanism as usual. The shaft is lubricated as it rotates within the shank 11 by a saturated piece of felt or the like 75 held by a retainer or plug 77. The shaft 45 is held from inward movement by a collar 79 which with suitable clearance may engage a shoulder of the shank of the frame. It is held from outward movement by a retainer 81 held by the frame and located in a recess 83 of the shaft. Rotor shaft 45 is equipped with a worm 85 and for this reason is usually designated as the first worm shaft. Within the cast frame 9 (see Fig. 6) is a recess 87 with which the passage through the shank communicates. In this recess 87 is located a second worm shaft 89 (see Fig. 4) which has a worm 91 engaging worm 85 and a worm 93 at its other end. One reduced end of the second worm shaft 93 is received in an opening 99 in the frame, and the other end, also reduced, is received within a bushing 95 which is pressed into a frame opening 97. A third worm shaft 101 is positioned vertically as best shown in Fig. 5. Its ends are mounted in openings 103 in the frame and 105 in the jewel plate 31. This third worm shaft has a worm 107 engaging worm 93 and a worm or gear element 109 at its other end.

The invention in the embodiment shown provides for two odometer wheel carrying shafts. Numeral 111 represents the shaft of the season set of wheels 113 (Fig. 1). Numeral 115 is a shaft for the trip set of wheels 117. Openings 119 in the frame walls 15 and 17 support the ends of these shafts. Between the adjacent wheels of each set are transfer pinion carrier plates 121. These plates are mounted on the shafts 111 and 115 respectively, and have radial extensions with notches as at 123. Secured to the bottom of the inverted field cup are stamped anchor plates 125, the upstanding flanges of which engage the notches of the plates 121 as shown best by Fig. 3. By this means the plates 121 are held from rotation to maintain the transfer pinions in fixed position relative to the number wheels. Preferably the plates 125 are secured by extruding lugs 120 from the bottom of the field cup, which lugs enter and are secured in holes provided in the plates 125. By this means there are no slots needed to receive the tongues 123 and there is therefore no reduction of material in the field plate whereby its efficiency may be lessened.

The worm 109 of the third worm shaft engages on one side a driven form 129 on the axis of the season set of wheels for driving the wheels of that set, and also engages on its other side an idler pinion 131, the axis of this pinion being mounted in a frame opening 133. By thus assembling the worm shaft a construction is provided rendering the frame and the shaft assembly adaptable for use with modified forms of odometer mechanism.

Pinion 131 normally (when the trip set is functioning) engages a pinion 135 which forms a part of a combined pinion and clutch element 137. This element is at all times in clutched engagement with the lowest denomination wheel of the trip set of wheels and is normally pressed to the right (Fig. 1) by a spring 140 to effect the engagement of the pinions 135 and 131. In this way the trip set is operated simultaneously with the season set of wheels. To reset the trip set an axially movable stem 139 is manually operated. In being moved inward cam faces 141 and 143 on the reset stem and clutch element, respectively, function to move the pinion 135 away from pinion 131 and to engage pinion 135 with a pinion 145 on the reset stem. Thereafter rotation of the stem 139 operates through the pinions 145 and 135 to reset the trip set of wheels as desired. The reset stem may be held yieldably in either of its two positions of adjustment by a locking detent 147 (Fig. 7) which is projected by a flat spring 149 secured to the frame through an opening 151 and received in one or the other of two annular grooves 153 of the stem.

The instrument as thus described accomplishes the several objects enumerated in a way which will be obvious without further description.

I claim:

1. In combination, speed indicating mechanism including an indicating device having as a part thereof a spindle, an inverted cup-shaped field plate, spring means secured to said spindle to bias said device to zero position, said cup having a continuous bridge extending diametrically above the bottom wall of said cup and integrally joining said bottom wall at its opposite ends, said bridge having a central opening, a spring regulator having an extruded portion rotatably supported in said opening and an arm attached to said spring.

2. The invention defined by claim 1, said regulator having its ends supported by the bottom of said cup and its intermediate pivoted portion sprung into the bridge opening whereby it is frictionally held in adjusted position.

RALPH O. HELGEBY.